United States Patent Office 3,214,977
Patented Nov. 2, 1965

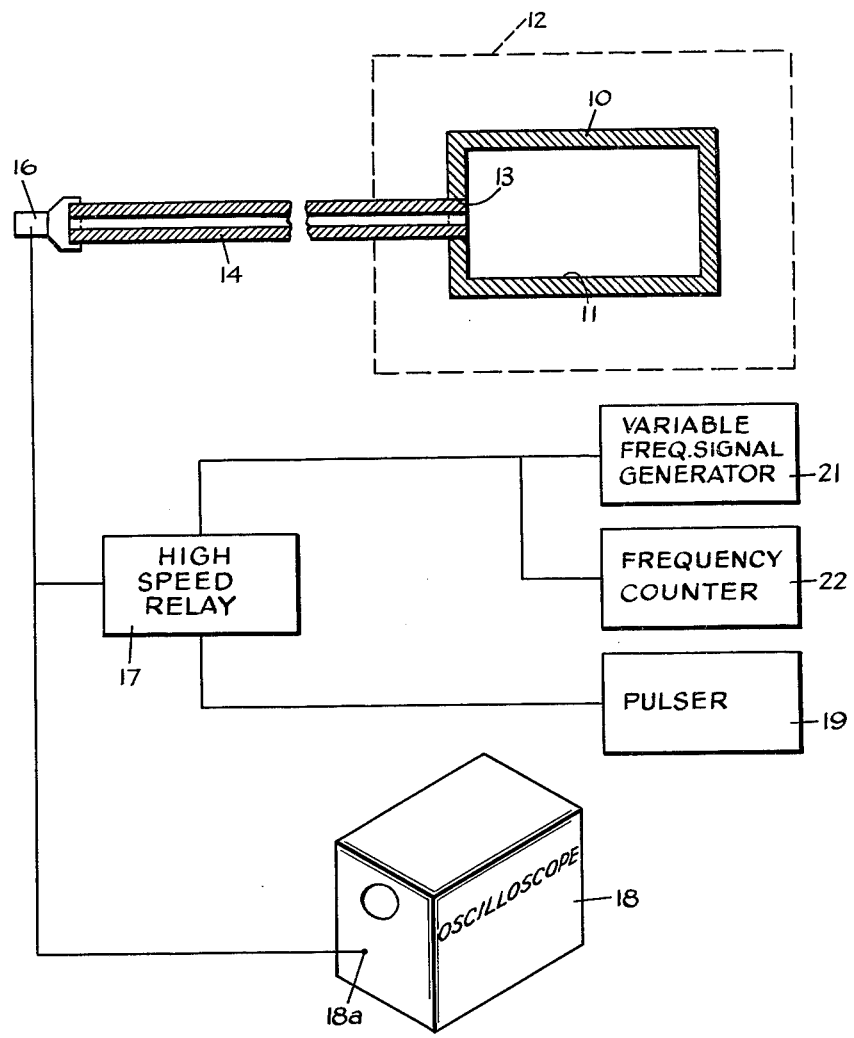

3,214,977
TEMPERATURE MEASURING APPARATUS
Joseph H. Apfel, San Diego, Calif., assignor to General Dynamics Corporation, New York, N.Y., a corporation of Delaware
Filed Apr. 27, 1961, Ser. No. 106,120
5 Claims. (Cl. 73—339)

The present invention relates to temperature measuring apparatus and more particularly to an acoustical thermometer which is capable of accurately effecting measurements of both high and low temperatures.

In a co-pending application Serial No. 65,694 which was filed by the assignee of the present invention on October 28, 1960, an acoustical thermometer is disclosed and claimed which is capable of accurately effecting temperature measurements over a range of approximately 20 to 2000° K. The temperature measuring device disclosed in the co-pending application employs a gas filled resonant cavity having a pair of coupling tubes that are attached thereto and utilized to transmit a signal of varying frequency to and from the cavity until a resonant condition is established therein. The device further utilizes one transducer to transmit the signal to and through the cavity and another transducer to receive the transmitted signal, the transducers being mounted within the extremities of the coupling tubes.

While certain features of the pressure invention are substantially similar to those embodied in the apparatus disclosed in the assignee's co-pending application, various distinct structural and functional differences exist between the two devices. More specifically, it is a prime object of the present invention to provide a new and improved temperature measuring apparatus which require the utilization of only one coupling tube to effect accurate measurements of temperatures.

Another object of the invention resides in the provision of a temperature measuring apparatus wherein a single transducer is utilized both to transmit a signal of determinable frequency through a fluid medium contained within an acoustical enclosure and to receive the transmitted signal whereby an accurate determination of the temperature of the medium can be effected upon the establishment of a resonant condition within the enclosure.

Other objects and advantages of the present invention will become apparent from the following description when considered in conjunction with the accompanying drawing:

In the drawing there is diagrammatically illustrated an acoustical thermometer embodying the principal features of the present invention.

As disclosed in the aforementioned co-pending application of the common assignee, the temperature (T) of an ideal gaseous medium contained within a chamber or resonant cavity is related to the square of the resonant frequency of vibration of the gaseous column by the following equation:

$$T = Kf^2 \quad (1)$$

wherein:

$T$ = temperature of the gaseous medium in absolute units
$f$ = resonant frequency of vibration of the gaseous column
$K$ = a proportionality constant representing the relationship $$\left(\frac{4L^2M}{n^2\gamma R}\right)$$

wherein:

$L$ = effective chamber length wherein the gaseous medium is confined
$M$ = molecular weight of the gaseous medium
$n$ = number of loops formed by vibration within the gas-filled chamber
$R$ = the gas constant
$\gamma$ = the ratio of the specific heats $c_p/c_v$ of the gaseous medium
$c_p$ = specific heat of the gas at constant pressure
$c_v$ = specific heat of the gas at constant volume (The relationship represented by Equation 1 and more particularly the proportionality constant K expressed therein is subject to slight variation when dealing with real gases over a wide range of temperatures.)

A preferred embodiment of the present invention accomplishes measurements which are utilized in the relationship expressed in Equation 1 to compute temperature. As illustrated, the apparatus includes an acoustical resonator that consists of a cavity defining enclosure having a single aperture preferably provided at one longitudinal extremity thereof. The cavity defined by the enclosure is filled with a suitable gas which is induced to oscillate in a longitudinal resonant mode by a signal of determinable frequency that is transmitted to the cavity through a coupling tube connected to the aperture provided in the enclosure. A single transducer is utilized to transmit the signal through the coupling tube. After the signal has been transmitted, the transducer is utilized as a receiver which detects the signal as reflected from the enclosure through the coupling tube.

The duration of the signal or wave packet that is transmitted to the gas filled cavity is chosen so that upon termination of the transmitted signal an interval of time elapses before the signal reflected by the enclosure is received. When the frequency of the signal transmitted to the cavity by the single transducer is such that a condition of acoustic resonance is established therein, the ratio of the amplitude of the reflected signal to the amplitude of the transmitted signal will be minimum. The ratio of the amplitudes reaches a minimum value inasmuch as the maximum amount of acoustic power is absorbed by the cavity at resonance.

Suitable control instrumentalities are provided for the apparatus so that the transmission of the signal or wave packet to the enclosure is automatically accomplished and the frequency thereof, which is varied over a selected range of frequencies, is accurately monitored. In addition, other devices are provided which simultaneously yield a visual representation of the transmitted and reflected signals so that a condition of acoustic resonance within the enclosure can be readily ascertained.

Referring more specifically to the drawing, a preferred embodiment of an acoustical thermometer which is capable of effecting temperature measurements includes a cylindrical resonator or acoustical enclosure 10 that defines a hollow inner chamber or resonant cavity 11. The resonator or enclosure 10 is located within a confined high or low temperature region generally designated by the numeral 12.

A single aperture 13 is formed in one longitudinal extremity of the enclosure 10, and one extremity of a coupling tube 14 is mounted therein by a suitable gas-tight fitting (not shown). The coupling tube 14 is of sufficient length so as to insulate an electroacoustic transducer 16 that is secured in gas-tight relation to the outwardly extending end portion thereof from the region 12.

In a preferred embodiment of the invention, the electroacoustic transducer 16 serves a dual function and is selectively utilized both as a transmitter and a receiver. As illustrated in the drawing, the transducer is electrically connected to a high speed relay 17 and also to the input terminal 18a of an oscilloscope 18.

The high speed relay 17, which is operated at a repetition rate controlled by a pulser 19, intermittently supplies an electrical signal of controlled duration from a variable frequency signal generator 21 to the transducer 16. The duration of the signal supplied to the transducer through the high speed relay 17 is chosen to be long compared to the period of the applied signal. That is, approximately 10 cycles at the transmitted frequency are applied to the transducer during the intermittent periods that the relay is in an actuated or energized state.

When the relay is energized to supply a signal of limited duration to the transducer 16, the transducer functions as an electroacoustic transmitter and delivers an acoustic signal or wave packet to the cavity 11 having a frequency corresponding to the output frequency of the signal generator 21. The cavity 11, whereto the acoustic signal is transmitted, is preferably filled with a suitable inert gas such as helium that is confined within the cavity at some preselected pressure and at a temperature substantially corresponding to the temperature of the region 12.

The wave packet or acoustic signal which is transmitted through the coupling tube 14 to the gas filled cavity 11 is reflected by the cavity and is applied to the transducer 16 through the coupling tube 14. Prior to the time that the signal is reflected to the transducer 16, the high speed relay is deenergized and the transducer functions as a receiver.

The signal supplied by the variable frequency signal generator through the high speed relay is fed to the input terminal of the oscilloscope as well as to the transducer 16. Similarly, the reflected signal received by the electroacoustic transducer 16 is supplied to the input terminal of the oscilloscope. When the frequency of the signal transmitted to the cavity approaches the resonant frequency thereof, the ratio of the amplitude of the reflected signal to the amplitude of the transmitted signal reaches a minimum value and is readily ascertainable from the trace appearing on the oscilloscope 18. The frequency at which this resonant condition is established within the cavity 11, as manifested by the relative amplitudes of the transmitted and received signals which appear on the oscilloscope, is determined from a frequency counter 22 that monitors the output signal from the generator 21.

In operation, the various electrical instrumentalities such as the signal generator 21, the high speed relay 17 and the oscilloscope 18 are rendered effective so that bursts or wave packets of acoustic energy are intermittently transmitted through the coupling tube 14 to the enclosure 10. At the outset of a measuring operation an approximation is made as to the resonant frequency of the gaseous column confined within the enclosure 10. Accordingly, the signal generator 21, which is to be uniformly and selectively varied over a range of frequencies until a resonant condition is established within the enclosure, is adjusted so that the output thereof is at a frequency somewhat below the approximated resonant frequency of the gaseous column. Thereafter, intermittent signals of uniformly increasing frequency are supplied through the high speed relay to the transducer 16.

Simultaneously therewith, the varying output from the signal generator is intermittently supplied to the input terminal of the oscilloscope 18. Accordingly, a trace of a transmitted signal at one frequency appears on the oscilloscope 18 along with a trace of this same signal which is reflected by the cavity 11. As the frequency of the signal applied from the generator 21 to the transducer approaches the resonant frequency of the acoustical enclosure 10, the ratio of the amplitudes of the reflected and transmitted signals appearing on the oscilloscope 18 approaches a minimum value and the trace of the reflected signal is seen to decay as a maximum amount of acoustic power is absorbed by the cavity. An increase in the frequency of the signal beyond the point of resonance is manifested as an increase in the ratio of the amplitudes of the reflected and transmitted signals.

By observing the trace appearing on the oscilloscope and simultaneously varying the output frequency of the signal generator an accurate determination of the resonant frequency of the acoustical resonator is effected. The value of the resonant frequency is derived from the frequency counter 22, and the temperature of the medium within the enclosure is determined from the relationship expressed in Equation 1, the factors included in the proportionality constant K being determined in a conventional manner.

In a specific embodiment of the invention, the enclosure 10 might be a hollow core in a graphite nuclear fuel element or other gas filled closed-end pipe which is disposed in an environment at the temperature of interest. The inside diameter and length of the enclosure 10, which preferably is proportioned in a right circular cylindrical configuration, is dependent upon the location wherein the enclosure is disposed, as well as the range of temperatures which are to be measured thereby. Correspondingly, the length and diameter of the coupling tube are determined for the most part by the uses to which the temperature measuring apparatus is applied. However, the length of the coupling tube is chosen sufficiently long so as to preclude the establishment of standing waves therein. Other factors which bear on the length and size of the coupling tube are the frequency range of the acoustic signals transmitted therethrough to the enclosure 10 and the length of the resonant cavity 11.

The electroacoustic transducer utilized in a preferred embodiment of the invention must be capable of transmitting and detecting sound waves with nearly equal efficiency. For this purpose, electrodynamic transducers similar to those utilized in pocket radios, hearing aids, and dictating machines are satisfactory. The remaining instrumentalities (i.e. the signal generator 21, frequency counter 22, pulser 19, high speed relay 17, and oscilloscope 18) are conventional commercially available units.

From the foregoing it is apparent that an improved temperature measuring apparatus has been provided which is both simple in operation and readily adaptable for use in any number of applications. Numerous modifications of the structural and functional features of the invention can be devised by those skilled in the art. Such modifications, however, would clearly fall within the spirit and scope of the invention as set forth in the following claims.

What is claimed is:

1. Apparatus for measuring temperature which comprises means defining an enclosed acoustical cavity, means connected to said cavity for transmitting intermittent signals of varying frequency thereto, each intermittently transmitted signal being reflected by said cavity and received by said transmitting means prior to the transmission of the next succeeding signal, means electrically connected to said transmitting means and responsive to each transmitted signal and the reflected signal corresponding thereto for yielding an indication of the establishment of a resonant condition within the cavity, and means electrically connected to said transmitting means for measuring the frequency of the transmitted signal which effects the establishment of a resonant condition within the cavity whereby the temperature therein can be determined.

2. Apparatus for measuring temperature which comprises means defining an enclosed acoustical cavity, an electroacoustic transducer, means selectively rendering said transducer effective to transmit intermittent signals of controlled duration, connected to said enclosed acoustical cavity for coupling the acoustic signals intermittently transmitted by said transducer to said cavity, each intermittently transmitted signal being reflected by said cavity and received by said transducer prior to the transmission of the next succeeding signal, means uniformly varying the frequency of successive signals intermittently transmitted to said cavity until a resonant condition is established therein, and means electrically connected to said transducer and responsive to each transmitted signal and the reflected signal corresponding thereto for yielding an indication of the establishment of a resonant condition within said cavity whereby the temperature therein can be determined.

3. Apparatus for measuring temperature which comprises means defining an enclosed acoustical cavity, a coupling tube connected to said cavity, means transmitting intermittent signals of varying frequency and intermittent duration through said coupling tube and to said cavity, each intermittently transmitted signal being reflected by said cavity through said coupling tube and received by said transmitting means prior to the transmission of the next succeeding signal, means electrically connected to said transmitting means and responsive to each transmitted signal and the reflected signal corresponding thereto for yielding an indication of the establishment of a resonant condition within the cavity, and means electrically connected to said transmitting means for measuring the frequency of the transmitted signal which effects the establishment of a resonant condition within the cavity whereby the temperature therein can be determined.

4. Apparatus for measuring temperature which comprises an enclosure defining an acoustical cavity and having a single aperture provided in one longitudinal extremity thereof, an elongated coupling tube having one extremity thereof connected to the aperture provided in said enclosure, an electroacoustic transducer secured in gas-tight relation to the other longitudinal extremity of said coupling tube, means selectively rendering said transducer effective to transmit intermittent signals of varying frequency and controlled duration through said coupling tube to said cavity, each intermittently transmitted signal being reflected by said cavity through said coupling tube and being received by said transducer prior to the transmission of the next succeeding signal, means uniformly varying the frequency of successive signals intermittently transmitted through said coupling tube to said cavity until a resonant condition is established therein, means electrically connected to said transducer for yielding a visual representation of each transmitted signal and the reflected signal corresponding thereto whereby a condition of acoustic resonance within said cavity can be determined, and means measuring the frequency of the transmitted signal effecting the establishment of the condition of acoustic resonance within said cavity whereby the temperature therein can be determined.

5. A device for measuring temperatures within the core of nuclear reactor wihch comprises an elongated enclosure adapted to be positioned within the core of the reactor, said enclosure defining a generally cylindrical cavity communicating with an open end portion thereof, an elongated coupling tube having one extremeity thereof connected to the open end portion of said enclosure, said coupling tube being of sufficient length to extend outwardly from the core of a reactor wherein the temperature measuring device is employed, an electroacoustic transducer secured in gas-tight relation to the other longitudinal extremity of said coupling tube, means selectively rendering said transducer effective to transmit intermittent signals of varying frequency and controlled duration through said coupling tube to said cylindrical cavity, each intermittently transmitted signal being reflected by said cavity through said coupling tube and being received by said transducer prior to the transmission of the next succeeding signal, means uniformly varying the frequency of successive signals intermittently transmitted through said coupling tube to said cavity until a resonant condition is established therein, means electrically connected to said transducer for yielding a visual representation of each transmitted signal and the reflected signal corresponding thereto whereby a condition of acoustic resonance within said cavity can be determined, and means measuring the frequency of the transmitted signal effecting the establishment of the condition of acoustic resonance within said cavity whereby the temperature therein can be determined.

References Cited by the Examiner
UNITED STATES PATENTS

| 2,571,979 | 10/51 | Webster | 181—.5 |
| 2,576,423 | 11/51 | Stewart | 181—.5 X |
| 2,582,232 | 1/52 | Cesaro et al. | 181—.5 |

ISAAC LISANN, *Primary Examiner.*

UNITED STATES PATENT OFFICE
CERTIFICATE OF CORRECTION

Patent No. 3,214,977                          November 2, 1965

Joseph H. Apfel

It is hereby certified that error appears in the above numbered patent requiring correction and that the said Letters Patent should read as corrected below.

Column 4, line 68, after "duration," insert -- means --; column 6, line 7, for "wihch" read -- which --; line 11, for "extremeity" read -- extremity --.

Signed and sealed this 9th day of August 1966.

(SEAL)
Attest:

ERNEST W. SWIDER                          EDWARD J. BRENNER
Attesting Officer                              Commissioner of Patents